(12) United States Patent
Zotz

(10) Patent No.: US 9,617,865 B2
(45) Date of Patent: Apr. 11, 2017

(54) GUIDE VANE FOR A TURBOMACHINE, GUIDE VANE CASCADE, AND METHOD FOR MANUFACTURING A GUIDE VANE OR A GUIDE VANE CASCADE

(71) Applicant: MTU Aero Engines AG, Munich (DE)

(72) Inventor: Georg Zotz, Haimhausen (DE)

(73) Assignee: MTU Aero Engines AG, Munich (DE)

( * ) Notice: Subject to any disclaimer, the term of this patent is extended or adjusted under 35 U.S.C. 154(b) by 460 days.

(21) Appl. No.: 14/242,152

(22) Filed: Apr. 1, 2014

(65) Prior Publication Data

US 2014/0294567 A1 Oct. 2, 2014

(30) Foreign Application Priority Data

Apr. 2, 2013 (EP) ..................................... 13161903

(51) Int. Cl.
*F01D 5/18* (2006.01)
*F01D 5/20* (2006.01)
(Continued)

(52) U.S. Cl.
CPC .............. *F01D 11/00* (2013.01); *B23P 15/04* (2013.01); *F01D 5/18* (2013.01); *F01D 5/20* (2013.01); *F01D 11/08* (2013.01); *F01D 17/14* (2013.01); *F01D 17/16* (2013.01); *Y02T 50/673* (2013.01); *Y02T 50/676* (2013.01); *Y10T 29/49336* (2015.01)

(58) Field of Classification Search
CPC ... F01D 5/18; F01D 5/20; F01D 11/00; F01D 11/08; F01D 17/14; F01D 17/16; B23P 15/04; Y02T 50/673; Y02T 50/676; Y10T 29/49336
See application file for complete search history.

(56) References Cited

U.S. PATENT DOCUMENTS

| 4,193,738 A | * | 3/1980 | Landis, Jr. ............ F01D 17/162 |
| | | | 277/387 |
| 5,184,459 A | * | 2/1993 | McAndrews ......... F01D 17/162 |
| | | | 415/149.2 |

(Continued)

FOREIGN PATENT DOCUMENTS

| DE | 102009053247 | 5/2011 |
| DE | 102010026139 | 1/2012 |

(Continued)

*Primary Examiner* — Audrey K Bradley
(74) *Attorney, Agent, or Firm* — Davidson, Davidson & Kappel, LLC

(57) ABSTRACT

A guide vane for a turbomachine axially pivotably coupled to a radially outwardly disposed flow-limiting wall and to a radially inwardly disposed inner ring of the turbomachine; and a trailing edge gap being formed between an upper trailing edge of the guide vane and the flow-limiting wall and/or between a lower trailing edge of the guide vane and the inner ring; the upper trailing edge and/or the lower trailing edge of the guide vane having at least one air outlet opening for an air outflow for forming an air curtain for at least partially sealing the trailing edge gap in the area of the upper trailing edge and/or the lower trailing edge in the area of the lower trailing edge. Also, a guide vane cascade, as well as a method for manufacturing a guide vane or a guide vane cascade.

10 Claims, 2 Drawing Sheets

(51) Int. Cl.
*F01D 11/08* (2006.01)
*F01D 11/00* (2006.01)
*F01D 17/14* (2006.01)
*B23P 15/04* (2006.01)
*F01D 17/16* (2006.01)

(56) References Cited

U.S. PATENT DOCUMENTS

| | | | | |
|---|---|---|---|---|
| 8,182,221 B1 * | 5/2012 | Liang | ................ | F01D 5/087 |
| | | | | 415/115 |
| 8,418,458 B2 | 4/2013 | Williams et al. | | |
| 2009/0068018 A1 | 3/2009 | Corten | | |
| 2014/0182292 A1 * | 7/2014 | Hudon | ............ | F01D 21/003 |
| | | | | 60/722 |

FOREIGN PATENT DOCUMENTS

| | | | | |
|---|---|---|---|---|
| DE | 102010026139 A1 * | 1/2012 | ............ | B22F 3/1055 |
| EP | 2037083 | 3/2009 | | |
| EP | 2216508 | 8/2010 | | |
| EP | 2366476 | 9/2011 | | |
| KR | 20110136296 | 12/2011 | | |
| WO | WO2007035758 | 3/2007 | | |

* cited by examiner

GUIDE VANE FOR A TURBOMACHINE, GUIDE VANE CASCADE, AND METHOD FOR MANUFACTURING A GUIDE VANE OR A GUIDE VANE CASCADE

This claims the benefit of European Patent Application EP13161903.3, filed Apr. 2, 2013 and hereby incorporated by reference herein.

The present invention relates to a guide vane for a turbomachine, in particular for a compressor or a turbine of an aircraft engine, the guide vane being axially pivotably coupled to a radially outwardly disposed flow-limiting wall and to a radially inwardly disposed inner ring of the turbomachine; and a trailing edge gap being formed between an upper trailing edge of the guide vane and the flow-limiting wall and/or between a lower trailing edge of the guide vane and the inner ring. The present invention also relates to a guide vane cascade, as well as to a method for manufacturing a guide vane or a guide vane cascade.

BACKGROUND

Guide vanes of this type for turbomachines are already known from the related art. The guide vanes are configured in a compressor or a turbine of the turbomachine, in particular a thermal gas turbine, in such a way that they are fixed relative to a housing of the turbomachine. The turbomachine also includes a plurality of rotating rotor blades that are assigned to at least one rotor and rotate relative to the fixed guide vanes, as well as the stationary housing. Moreover, the guide vanes are coupled to a radially inwardly disposed, static inner ring. To enhance the efficiency of the turbomachine, the guide vanes, which are fixed relative to the rotor blades, can be displaceably, respectively pivotably configured about a radial axis. What is generally referred to as a trailing edge gap is thereby produced in each case between the inner side of the housing and a radially outer, upper trailing edge of the guide vane, respectively between the inner ring and the radially inner, lower trailing edge of the guide vane. The size of the trailing edge gap is dependent on the angular position of the guide vane. The greater the dimensions of the trailing edge gap, the more negative the effect thereof on the efficiency and the surge limit of the turbomachine. This arises, in particular, from the fact that the trailing edges are circumflowed by the working medium of the turbomachine, in particular, by air.

SUMMARY OF THE INVENTION

It is an object of the present invention to provide a guide vane or a guide cascade of the type mentioned at the outset that will ensure an enhanced efficiency of a turbomachine. It is a further object of the present invention to manufacture such a guide vane or such a guide vane cascade with geometrical accuracy and inexpensively.

The present invention provides a guide vane, by a guide vane cascade, as well as by a method.

In the case of a guide vane according to the present invention for a turbomachine, in particular for a compressor or a turbine of an aircraft engine, the guide vane is axially pivotably coupled to a radially outwardly disposed flow-limiting wall and to a radially inwardly disposed inner ring of the turbomachine; a trailing edge gap being formed between an upper trailing edge of the guide vane and the flow-limiting wall and/or between a lower trailing edge of the guide vane and the inner ring. The upper trailing edge and/or the lower trailing edge of the guide vane have/has at least one air outlet opening for an air outflow for forming an air curtain for at least partially sealing the trailing edge gap in the area of the upper trailing edge, and/or the lower trailing edge in the area of the lower trailing edge. By forming the air curtain in the trailing-edge gaps to the radially outer flow-limiting wall, which, in particular, may be assigned to a housing of the turbomachine and/or to the inner ring of the turbomachine, a sealing of the trailing-edge gap is achieved that leads to an enhanced efficiency of the turbomachine. The trailing edge gap is no longer able to be circumflowed by air. The number and form of the air outlet openings may be selected in such a way that the trailing edge gap(s) is/are sealed over the entire adjustment range(s) of the guide vanes.

In one advantageous embodiment of the guide vane according to the present invention, the air outlet opening communicates air-conductively via at least one channel with at least one air inlet opening on a blade surface of the guide vane. The air inlet opening may be configured on the pressure side of the guide vane. As a result, a sufficient air volume is always available for producing the air curtain to seal the trailing edge gap. In this context, the expression "air" connotes any possible usable gaseous working medium of the turbomachine.

Another advantageous embodiment of the guide vane according to the present invention provides that at least one localized thickened portion of the blade of the guide vane be formed in the area of the air inlet opening prior to the manufacture of the air inlet opening. This makes it advantageously possible to use virtually any position for the air inlet opening on the blade. In particular, this allows an optimal aerodynamic positioning of the air inlet opening.

Another advantageous embodiment of the guide vane according to the present invention provides that at least one air baffle be configured on the blade in the area of the air inlet opening. This allows air currents to be selectively directed into the air inlet opening.

Other advantageous embodiments of the guide vane according to the present invention provide for the air outlet opening to be funnel- or slit-shaped. However, other specific embodiments are also conceivable. The funnel-shaped form of the air outlet opening ensures that a sufficient air volume is always available. The slit-shaped form of the air outlet opening may be used for exactly controlling the shape of the thereby forming wall of air. In particular, the longitudinal axes of a plurality of serially disposed air outlet openings may extend approximately in parallel to the blade cross section of the guide vanes. This ensures that the appropriate wall of air is formed over the entire lower trailing edge.

The present invention also relates to a guide vane cascade of a turbomachine, in particular of a compressor or a turbine of an aircraft engine, including at least two guide vanes in accordance with the present invention. The form of such adjustable guide cascades according to the present invention ensures an enhanced efficiency of the corresponding turbomachine.

The present invention also relates to a method for manufacturing a guide vane or a guide vane cascade, as described in the preceding; the guide vane or the guide vane cascade being manufactured using a generative production process. The generative production process may be a selective laser melting process or a selective laser sintering process. Other generative manufacturing processes are also conceivable. By using generative production processes, the guide vanes or the corresponding guide vane cascades may be manufactured with geometrical accuracy and inexpensively. However, it is self-evident that conventional manufacturing processes, such as casting processes, for example, may be used to produce the guide vanes according to the present invention or the guide vane cascade according to the present invention.

Other features of the present invention are derived from the claims, the exemplary embodiment, as well as in light of the drawing. The aforementioned features and combinations of features, as well as the features and combinations of features mentioned in the exemplary embodiments may be used not only in the particular stated combination, but also in other combinations or alone, without departing from the scope of the present invention.

DETAILED DESCRIPTION

Figure 1:
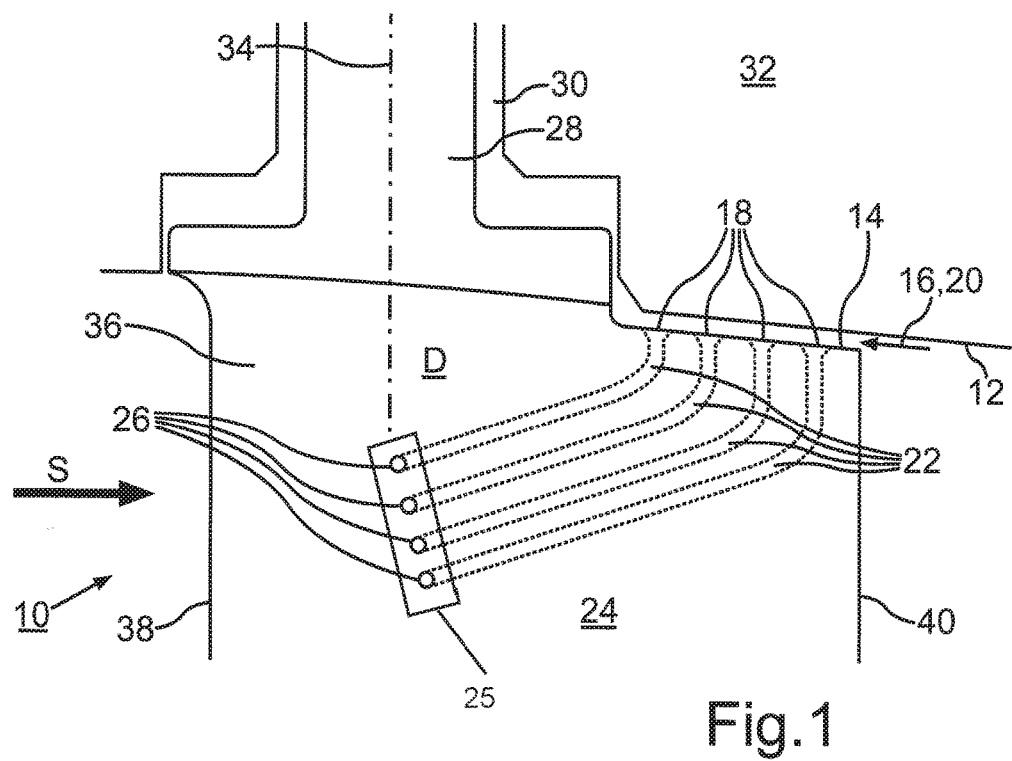
FIG. 1 a schematic representation of a partial area of a guide vane according to the present invention.

Guide vane 10 partially illustrated in FIG. 1 is axially pivotably coupled by radially outwardly disposed end thereof to a flow-limiting wall 12. In the illustrated exemplary embodiment, wall 12 is a housing 32 of an axial compressor of a turbomachine, in particular of an aircraft engine. It is discernible that guide vane 10 is configured on a corresponding inner side of flow-limiting housing wall 12. It is also discernible that guide vane 10 features a leading edge 38 and a trailing edge 40, which, in a corresponding flow volume, are oriented in a flow direction S of the turbomachine. Moreover, guide vane 10 is coupled to a radially inwardly disposed inner ring of the turbomachine. A trailing edge gap 16 is formed between an upper trailing edge 14 of guide vane 10 and flow-limiting wall 12. This holds correspondingly for the lower trailing edge of guide vane 10 and the inner ring of turbomachine. It is discernible that upper trailing edge 14 has a plurality of air outlet openings 18 for an air outflow for forming an air curtain 20 for sealing trailing edge gap 16 in the area of upper trailing edge 14. Air outlet openings 18 are funnel-shaped. Moreover, the particular air outlet openings 18 each communicate air-conductively via a channel 22, which is formed within a blade 36 of guide vane 10, with an air inlet opening 26 on a surface 24 of blade 36. It may also be appreciated that air inlet openings 26 are formed on pressure side D of guide vanes 10. Also illustrated is an optional baffle 25 which is configured on the blade in the area of the inlet openings 26 to allow air currents to be selectively directed to the air inlet openings 26.

Guide vane 10 is pivotably mounted about an axis of rotation 34 in housing 32. A pivot pin 28 extends into a corresponding recess 30 of housing 32 and is pivotably mounted therein.

Figure 2:
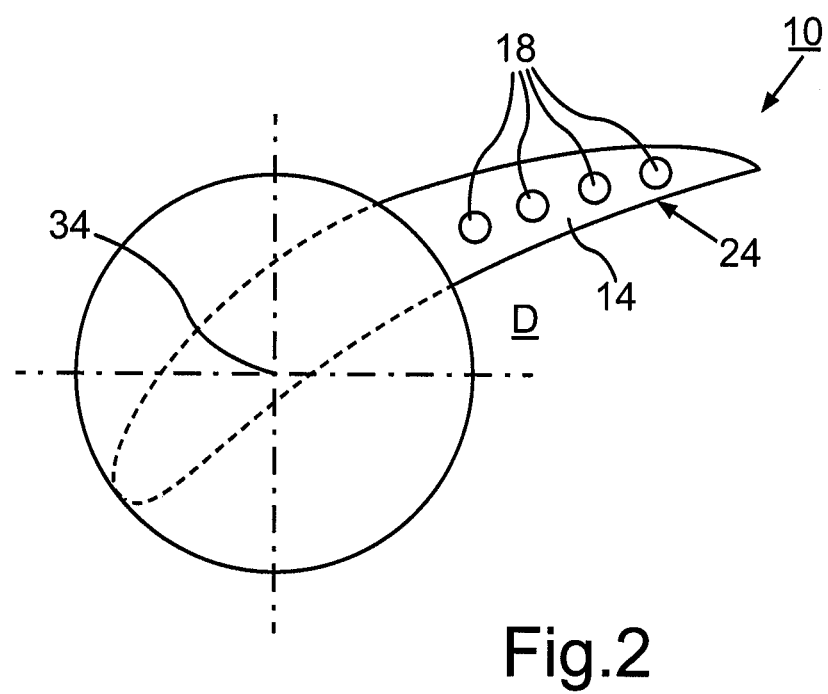
FIG. 2 a schematically illustrated plan view of the inventive guide vane.

FIG. 2 shows a schematically illustrated view of pivotable guide vane 10 in accordance with FIG. 1. It is discernible that air outlet openings 18 are configured on upper trailing edge 14. The air inlet openings are formed on blade surface 24 on the pressure side of guide vane 10. Guide vane 10 is pivotably mounted about axis of rotation 34.

Guide vane 10 shown in FIGS. 1 and 2 may be coupled to a plurality of further guide vanes to form an adjustable guide cascade. Besides the option of manufacturing the guide cascade or guide vane 10 using conventional casting processes, a generative production process, in particular a selective laser melting or selective laser sintering process, may also be used to manufacture guide vanes 10 or a corresponding guide vane cascade composed of a plurality of guide vanes 10. In this context, a two-stage process is repeatedly carried out; a uniform powder bed of a metal powder being prepared in a first stage of the two-stage process. The metal powder of the powder bed is selectively fused on and consolidated in a second stage, on the basis of layers generated by a three-dimensional CAD model. By repeatedly executing this two-stage process, guide vane 10 to be manufactured or the corresponding guide vane cascade is built up in layers and, thus, successively. The metal powder prepared in the first step is composed, in particular, of a nickel- or titanium-based alloy.

What is claimed is:

1. A guide vane for a turbomachine comprising:
   an upper trailing edge and a lower trailing edge, the guide vane being axially pivotably coupled to a radially outwardly disposed flow-limiting wall and to a radially inwardly disposed inner ring of the turbomachine, a trailing edge gap being formed between the upper trailing edge of the guide vane and the flow-limiting wall or between the lower trailing edge of the guide vane and the inner ring,
   wherein the upper trailing edge or the lower trailing edge of the guide vane has at least one air outlet opening for an air outflow for forming an air curtain for at least partially sealing the trailing edge gap in the area of the upper trailing edge or the trailing edge gap in the area of the lower trailing edge;
   wherein the guide vane has a blade surface, the air outlet opening communicating air-conductively via at least one channel with at least one air inlet opening on the blade surface; and
   wherein the air inlet opening is configured on a pressure side of the guide vane.

2. The guide vane as recited in claim 1 wherein at least one localized thickened portion of the guide vane is formed in the area of the air inlet opening prior to the manufacture of the air inlet opening.

3. The guide vane as recited in claim 1 further comprising at least one air baffle in the area of the air inlet opening.

4. The guide vane as recited in claim 1 wherein the air outlet opening is configured to be funnel- or slit-shaped.

5. A compressor or turbine of an aircraft engine comprising the guide vane as recited in claim 1.

6. A guide vane cascade of a turbomachine comprising at least two guide vanes as recited in claim 1.

7. A compressor or turbine of an aircraft engine comprising the guide vane cascade as recited in claim 6.

8. A method for manufacturing a guide vane cascade as recited in claim 6 wherein the at least two guide vanes are manufactured using a generative production process.

9. A method for manufacturing a guide vane as recited in claim 1 wherein the guide vane is manufactured using a generative production process.

10. The method as recited in claim 9 wherein the generative production process is a selective laser melting process or a selective laser sintering process.

* * * * *